US012754865B2

(12) United States Patent
Mutter et al.

(10) Patent No.: US 12,754,865 B2
(45) Date of Patent: Oct. 6, 2026

(54) COMMANDER SUBSCRIBER STATION FOR A SERIAL BUS SYSTEM, RESPONDER SUBSCRIBER STATION FOR A SERIAL BUS SYSTEM, AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 18/809,591

(22) Filed: Aug. 20, 2024

(65) Prior Publication Data

US 2025/0086130 A1 Mar. 13, 2025

(30) Foreign Application Priority Data

Sep. 12, 2023 (DE) ..................... 10 2023 208 817.7

(51) Int. Cl.
*G06F 13/362* (2006.01)
*G06F 13/42* (2006.01)

(52) U.S. Cl.
CPC ........ *G06F 13/362* (2013.01); *G06F 13/4282* (2013.01)

(58) Field of Classification Search
CPC ..................................................... G06F 16/955
See application file for complete search history.

(56) References Cited

U.S. PATENT DOCUMENTS 9,742,584 B2 * 8/2017 Hartwich ................ H04L 69/18
2020/0090808 A1 * 3/2020 Carroll .................... H04L 67/12

OTHER PUBLICATIONS

ISO 11898-1:2015 Standard, "Road Vehicles—Controller Area Network (CAN)—Part 1: Data Link Layer and Physical Signalling," 2015, pp. 1-74.

* cited by examiner

*Primary Examiner* — Henry Tsai
*Assistant Examiner* — Juanito C Borromeo
(74) *Attorney, Agent, or Firm* — Norton Rose Fulbright US LLP

(57) ABSTRACT

A commander subscriber station for a serial bus system, a responder subscriber station for the serial bus system, and a method for communication in a serial bus system. The commander subscriber station includes a communication control device for controlling communication between the subscriber station and at least another subscriber station and for evaluating at least one signal received from a bus of the bus system using a predetermined first frame or a predetermined second frame, and a status information module for evaluating the at least one signal received from the bus with respect to a predetermined control bit. The communication control device is configured to use the predetermined second frame to request a responder subscriber station subordinate to the commander subscriber station to send at least one first signal according to the predetermined second frame which differs from the predetermined first frame via the bus.

16 Claims, 6 Drawing Sheets

COMMANDER SUBSCRIBER STATION FOR A SERIAL BUS SYSTEM, RESPONDER SUBSCRIBER STATION FOR A SERIAL BUS SYSTEM, AND METHOD FOR COMMUNICATION IN A SERIAL BUS SYSTEM

CROSS REFERENCE

The present application claims the benefit under 35 U.S.C. § 119 of German Patent Application No. DE 10 2023 208 817.7 filed on Sep. 12, 2023, which is expressly incorporated herein by reference in its entirety.

FIELD

The present invention relates to a commander subscriber station for a serial bus system, a responder subscriber station for a serial bus system, and a method for communication in a serial bus system.

BACKGROUND INFORMATION

Bus systems are used in many areas of technology for communication between technical devices, such as sensors and control devices.

The use of Classical CAN and/or CAN FD, which are both standardized in the international standard ISO 11898-1:2015, for communication between devices in vehicles and/or other technical equipment is well-known.

The subscriber stations of such a bus system are also referred to as nodes. Such subscriber stations comprise a microcontroller that supports all functions of the abovementioned standard for Classical CAN and/or CAN FD.

Such bus systems can include at least one subscriber station that is required to carry out only very simple function(s), for example an indicator light, in particular a light-emitting diode (LED), to be switched on or off under the control of the microcontroller of another subscriber station and/or required to change color as needed. A sensor can furthermore be present and controlled, that has to periodically provide its acquisition data to the microcontroller of another subscriber station. Such subscriber stations for carrying out the simple functions can also be referred to as responders. A subscriber station comprising the microcontroller controlling a responder is also referred to as a commander.

The specification of the CAN protocol variant "CAN FD Light" is currently being fine-tuned for a more cost-effective connection of responders to CAN bus systems. "CAN FD Light" is also abbreviated to FDL and specifies communication between a commander and at least one responder. The intent is to use frames without bit rate switching in FDL communication. FDL is currently specified in CiA 604-1 and is also to be included in the next revised version of ISO 11898-1.

FDL is intended for CAN bus systems in which a commander CAN subscriber station controls the function(s) of multiple responder CAN subscriber stations. FDL does not support arbitration. The commander therefore uses the "polling" principle to communicate with the responders. The commander is a control device comprising a microcontroller on which the application software runs. The microcontroller includes a CAN controller that can transmit and receive CAN FD frames in accordance with ISO 11898-1:2015. The polling is also carried out by sending a CAN FD frame.

The responders are application-specific integrated circuits, also referred to as ASICs, that comprise an FDL controller. The responders have little or no local computing power and can control simple functions, e.g. light diode (LED) on/off, light diode (LED) color, as described above. A responder only sends a CAN FD frame if it has been requested to do so by the commander via polling.

To enable cost-effective integration of a responder on a single ASIC in a mixed semiconductor process, such as bipolar transistor(s) and CMOS transistor(s) and DMOS transistor(s) (BCD technology), an FDL controller is integrated in a responder. The FDL controller is much simpler than a CAN FD controller.

The responder CAN subscriber stations (responders) send their function information, e.g. a sensor value, to the commander CAN subscriber station (commander) via a normal CAN FD message after polling by the commander. The problem, however, is that the commander also has to be informed about the operating status of the responder. To do this, the FDL controller of the responder either uses a frame with a longer data field in which function information and status information are combined. or the information is sent via the bus in a separate, additional CAN FD message after renewed polling by the commander.

A major disadvantage is that the mentioned options for sending the information to the commander cost additional time for transmission on the bus, which slows down communication in the bus system between the FDL commander and other CAN FD subscriber stations. This reduces the transmittable net data rate of the bus system.

SUMMARY

It is an object of the present invention to provide a commander subscriber station for a serial bus system, a responder subscriber station for a serial bus system and a method for communication in a serial bus system that solve the aforementioned problems. The intent is in particular to provide a commander subscriber station for a serial bus system, a responder subscriber station for a serial bus system and a method for communication in a serial bus system in which responder status information can be transmitted between responder CAN subscriber stations and their higher-level commander CAN subscriber station with both high error robustness and a high net data transmission rate of the communication in the bus system.

The object may be achieved by a commander subscriber station for a serial bus system having certain features of the present invention. According to an example embodiment of the present invention, the commander subscriber station comprises a communication control device for controlling communication between the subscriber station and at least one other subscriber station of the bus system and for evaluating at least one signal received from a bus of the bus system using a predetermined first frame, in which the bit time in a first communication phase can differ from a bit time in a second communication phase, and a status information module for evaluating the at least one signal received from the bus with respect to a predetermined control bit, wherein the communication control device is configured to use the predetermined second frame to request a responder subscriber station subordinate to the commander subscriber station to send at least one first signal according to the predetermined second frame which differs from the predetermined first frame via the Bus, and wherein the status information module is configured to instruct the communication control device based on the evaluation of the value of the predetermined control bit to use the second predetermined frame to request the responder subscriber station to send at least one second signal according to the second predetermined frame via the bus in order to receive status information from the responder subscriber station.

The described commander subscriber station according to the present invention is configured by the status information module to not send any information related to the fault containment function of the CAN protocol when communicating with the responder subscriber stations, in particular in the control field, or to expect any information from a responder. Thus, when a responder subscriber station is communicating with its commander subscriber station, an already existing control bit, in particular the ESI bit, can be used in the CAN FD frame to transmit information from the responder subscriber station to the higher-level commander subscriber station. The commander subscriber station can nonetheless continue to use the original fault confinement function, according to which the commander subscriber station uses its error counter, and go into the error passive state or the bus off state as described in ISO 11898-1:2015. When communicating with other non-responder subscriber stations, however, the described commander subscriber station can send and receive information related to the fault containment function of the CAN protocol in the control field of a frame as usual.

The commander subscriber station is thus still compatible with CAN FD and very advantageously receives additional information without transmitting additional frames/messages, in particular CAN FD frames, via the bus or without using a longer data field in a frame/message.

According to an example embodiment of the present invention, if the ESI bit is not being used for other purposes, the responder subscriber station always sends the ESI bit in the FD, more precisely FDL, frames, it sends as '0'. Conversely, the commander subscriber station is configured by the status information module with respect to a responder subscriber station to use the ESI bit to identify the status of the connected responder subscriber station.

The responder subscriber station according to an example embodiment of the present invention moreover does not have an error counter, because the fault containment function of the CAN protocol is omitted. The responder can therefore neither switch to the error passive state nor switch itself off from the bus (go bus off).

Overall, the subscriber stations according to the present invention contribute to making the bus system more cost-efficient while still enabling robust and reliable CAN communication.

Advantageous further embodiments of the subscriber station of the present invention are disclosed herein.

According to an example embodiment of the present invention, the predetermined control bit according to the predetermined second frame can be provided for information about the presence or absence of an error passive state of the subscriber station that sent the received signal to the bus, wherein the status information module is configured, evaluate the predetermined control bit according to the predetermined second frame as a change in status information of a responder subscriber station that is controlled with the commander subscriber station via the bus and cannot go into the error passive state.

It is possible that the status information module is configured to instruct the communication control device to use the predetermined second frame to request the responder subscriber station to send a second signal according to the predetermined second frame via the bus if the evaluation of the signal received from the bus shows that the value of the predetermined control bit according to the predetermined second frame corresponds to the information about the presence of an error passive state of the subscriber station that sent the received signal to the bus.

According to an example embodiment of the present invention, the commander subscriber station can be a CAN FD subscriber station, wherein the predetermined first frame is a CAN FD frame in FEFF format, and wherein the predetermined second frame is a CAN FD frame in FBFF format.

According to an example embodiment of the present invention, the status information module can comprise an evaluation block for evaluating the predetermined control bit.

According to an example embodiment of the present invention, the communication control device can be configured to negotiate with the other subscriber stations in the first communication phase of the predetermined first frame which of the subscriber stations of the bus system will receive at least temporarily exclusive, collision-free access to the bus in the following second communication phase.

The aforementioned object may also be achieved by a responder subscriber station for a serial bus system having certain features of the present invention. According to an example embodiment of the present invention, the responder subscriber station comprises a communication control device for controlling communication between the subscriber station and a higher-level commander subscriber station of the bus system and for evaluating at least one signal received from a bus of the bus system using a frame in which the bit time in a first communication phase can differ from a bit time in a second communication phase, and a status information module configured to detect a change in the status information of the responder subscriber station, wherein the status information module is configured to indicate, after detecting a change in the status information of the responder subscriber station in a predetermined control bit of a frame to be sent by the responder subscriber station to the commander subscriber station for the first message following the change, that a change in the status of the responder subscriber station has occurred, wherein the communication control device is configured, upon request from the commander subscriber station, to send a signal according to the first frame for the first message following the change to the bus to the commander subscriber station, wherein the status information module is configured to insert the changed status information into a data field of a second frame for the second message following the change to the commander subscriber station, and wherein the communication control device is configured, upon request from the commander subscriber station, to send a signal according to the second frame for the second message following the change to the bus to the commander subscriber station.

According to an example embodiment of the present invention, the responder subscriber station can be configured to evaluate the status information acquired by the status information module with respect to at least one parameter, but not go into an error passive state, even if the evaluation shows that there is an error in the responder subscriber station.

According to an example embodiment of the present invention, the status information can include at least one item of information relating to the communication between the responder subscriber station and the higher-level commander subscriber station.

Additionally or alternatively, the status information includes at least one item of information relating to a status of a technical application of the responder subscriber station.

Additionally or alternatively, the status information is defined individually for the responder subscriber station depending on the technical application of the responder subscriber station.

It is possible that the status information includes at least one item of information relating to a health status of the responder subscriber station, wherein the health status is a failure to receive a frame from the commander subscriber station past a predetermined waiting period or a malfunction of a technical application of the responder subscriber station.

It is possible that the status information module comprises an acquisition block for acquiring the status information, an evaluation block for evaluating an acquisition result of the acquisition block based on at least one parameter, and an insertion block for inserting the status information into a frame to be created by the responder subscriber station based on the evaluation carried out by the evaluation block.

According to an example embodiment of the present invention, at least two subscriber stations can be part of a bus system which also includes a bus, wherein the at least two subscriber stations are connected to one another via the bus such that they communicate in series with one another and at least one of the subscriber stations is an above-described commander subscriber station and at least one of the subscriber stations is an above-described responder subscriber station, wherein each of the at least two subscriber stations also comprises a transmitting/receiving device for transmitting a transmission signal to the bus of the bus system and/or for receiving a signal from the bus of the bus system.

The bus system optionally also comprises at least one third subscriber station which is configured to negotiate with the other subscriber stations (10; 20; 30) in the first communication phase (451) of the predetermined first frame (450), which of the subscriber stations (10, 20, 30) of the bus system (1) will receive at least temporarily exclusive, collision-free access to the bus (40) in the following second communication phase (452).

The aforementioned object may also be achieved by a method for communication in a serial bus system including certain features of the present invention. The method is carried out with an above-described commander subscriber station and an above-described responder subscriber station.

The method of the present invention provides the same advantages as those mentioned above with reference to the subscriber station of the present invention.

Other possible implementations of the present invention also include not explicitly mentioned combinations of features or embodiments of the present invention described above or in the following with respect to the embodiment examples. The person skilled in the art will also add individual aspects as improvements or additions to the respective basic form of the present invention.

BRIEF DESCRIPTION OF THE DRAWINGS

The present invention is described more detail in the following with reference to the figures and on the basis of embodiment examples.

In the figures, the same or functionally similar elements are provided with the same reference signs unless stated otherwise.

DETAILED DESCRIPTION OF EXAMPLE EMBODIMENTS

Figure 1:
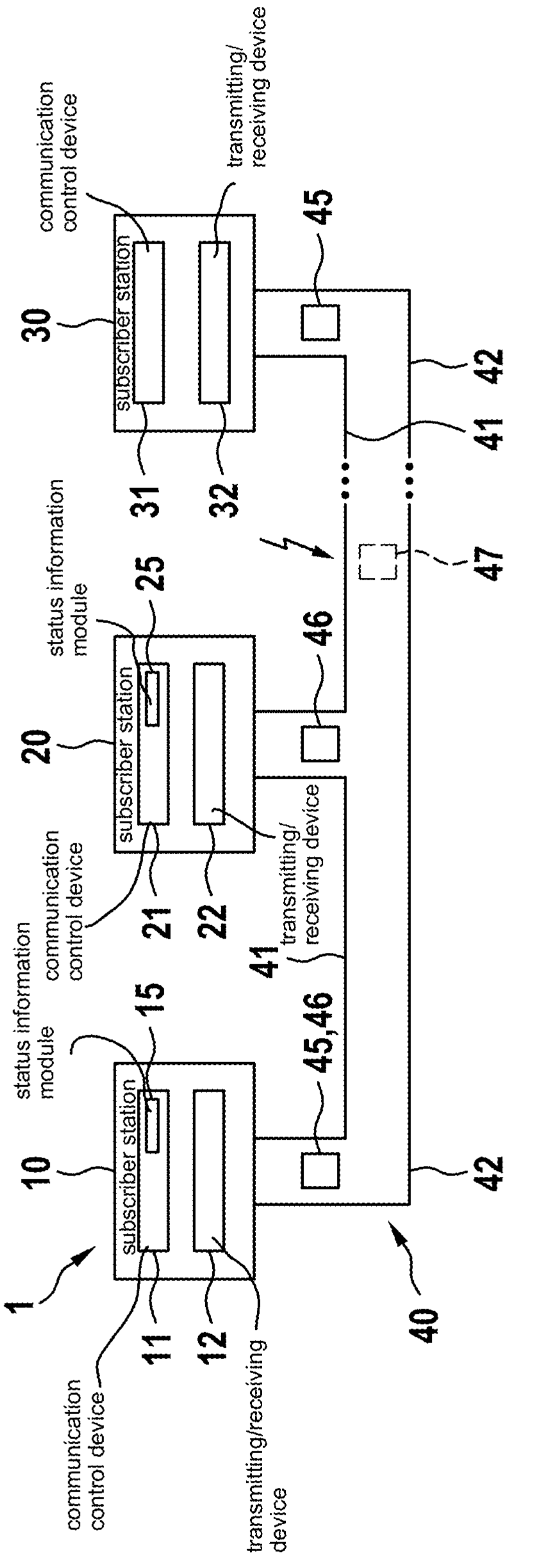
FIG. 1 shows a simplified block diagram of a bus system according to a first embodiment example of the present invention.

As an example, FIG. 1 shows a bus system 1 that is in particular configured to be the basis for a CAN bus system, a CAN FD bus system and/or modifications thereof as described in the following. The bus system 1 can be used in a vehicle, in particular a motor vehicle, an aircraft, etc., or in a hospital, etc.

The bus system 1 in FIG. 1 comprises a plurality of subscriber stations 10, 20, 30 that are all connected to a bus 40 with a first bus wire 41 and a second bus wire 42. The subscriber station 10 is a commander subscriber station, for example, and the subscriber station 20 is a responder subscriber station as described in more detail in the following. The bus wires 41, 42 can also be referred to as CAN_H and CAN_L and are used for electrical signal transmission after coupling in the dominant levels or generating recessive levels or other levels for a signal in the transmission state. Messages 45, 46 in the form of signals can be transmitted in series between the individual subscriber stations 10, 20, 30 via the bus 40. If an error occurs on the bus 40 during the communication, as indicated by the zig-zag arrow in FIG. 1, an error frame 47 with an error flag and an error delimiter can optionally be transmitted. The subscriber stations 10, 20, 30 of FIG. 1 are, for instance, control devices, sensors, display devices, etc. of a motor vehicle or some other technical system as described in more detail in the following.

As shown in FIG. 1, subscriber station 10 comprises a communication control device 11, a transmitting/receiving device 12 and a status information module 15. The subscriber station 20 comprises a communication control device 21, a transmitting/receiving device 22 and a status information module 25. The subscriber station 30 comprises a communication control device 31 and a transmitting/receiving device 32. The transmitting/receiving devices 12, 22, 32 of the subscriber stations 10, 20, 30 are all connected directly to the bus 40 even though this is not shown in FIG. 1.

The communication control devices 11, 21, 31 are all used to control communication of the respective subscriber station 10, 20, 30 via the bus 40 with at least one other subscriber station of the subscriber stations 10, 20, 30 that are connected to the bus 40. For this purpose, the communication control devices 11, 31 create and/or read first messages 45 which are modified CAN FD messages 45, for example. The modified CAN FD messages 45 are structured on the basis of a CAN FD format, which is described in more detail with reference to FIG. 2. If necessary, the communication control devices 11, 21, 31 create a transmission signal TxD, which is described in more detail in the following with reference to FIG. 5. The communication control devices 11, 21, 31 also read or decode a reception signal RxD, which is described in more detail in the following with reference to FIG. 8.

The communication control device 11, 31 can be designed, at least in part, like a conventional CAN controller according to ISO 11898-1:2015, i.e. like a CAN FD tolerant Classical CAN Controller or a CAN FD controller. The CAN FD messages 45 can include a number of 0 to 64 data bytes, which are moreover also transmitted at a significantly faster data rate than in a Classical CAN message. The communication control device 31 is in particular embodied like a conventional CAN FD controller.

The communication control device 11 is also designed to provide a CAN FD message 45 for at least one of the subscriber stations 20, 30 or receive an FDL message 46 from the subscriber station 20 as needed. The respective status information modules 15, 25 are used to transmit and receive the FDL message 46. The FDL message 46 is structured on the basis of an FBFF format from ISO 11898-1:2015, which is described in more detail with reference to FIG. 3.

The communication control device 11 thus creates and reads a first message 45 or creates and reads a second message 46, wherein the first and second message 45, 46 differ in terms of their data transmission standard, in this case specifically CAN FD and FDL. As already mentioned above respect to the related art, only frames without bit rate switching are used in FDL communication and FDL does not support arbitration.

The communication control device 21 is embodied as an FDL controller. There is also the status information module 25 which has functions that are compatible with the functions of the status information module 15. The communication control device 21 creates and reads second messages 46, for example FDL messages 46, and reads first messages 45.

Figure 3:
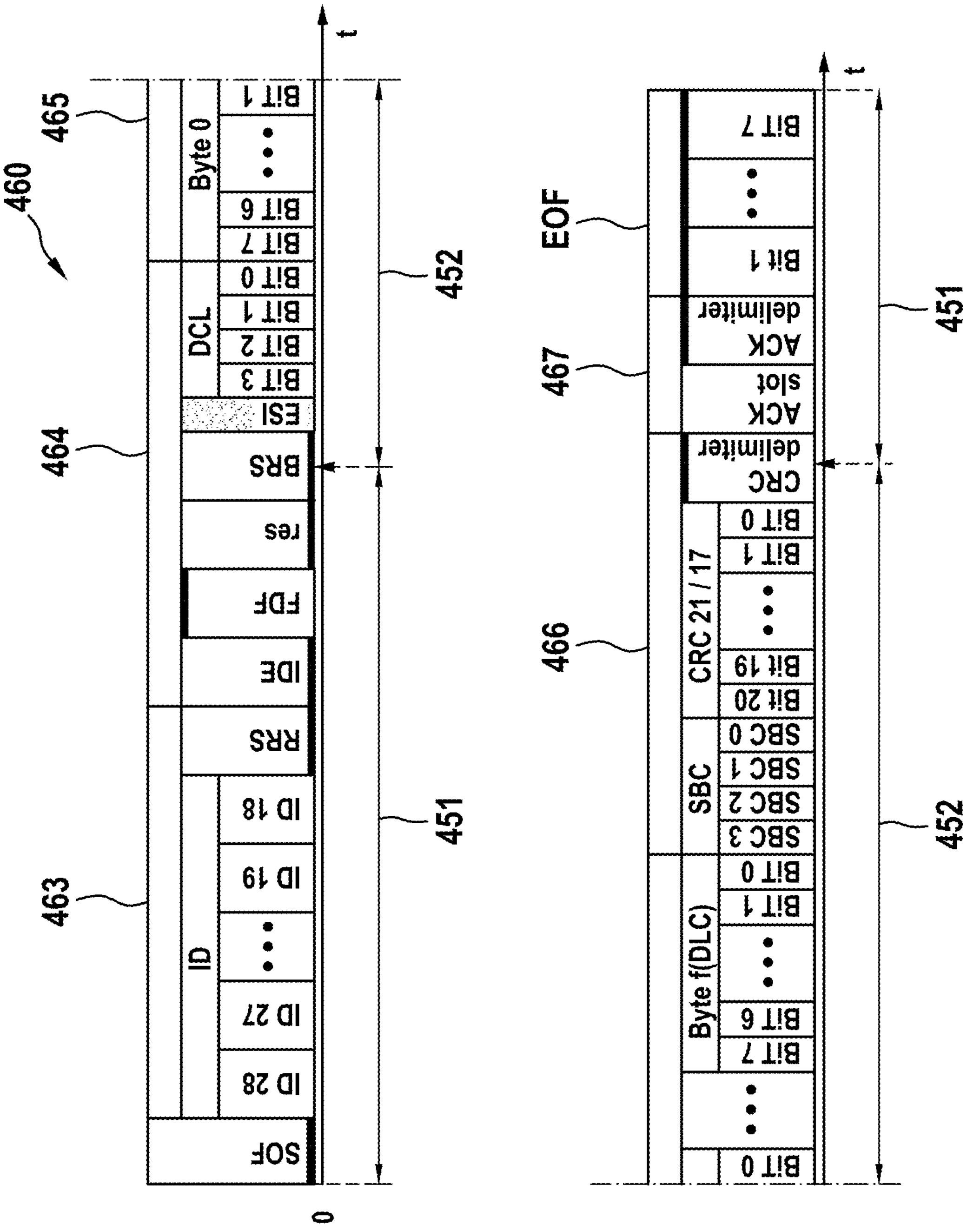
FIG. 3 shows the format of CAN FD frames without bit rate switching for a message that can be sent as an alternative to the CAN FD frame of FIG. 2 by a transmitting/receiving device for a subscriber station, in particular a responder subscriber station, of the bus system according to the first embodiment example of the present invention.

To communicate with the subscriber station 20, the subscriber station 10 sends a polling to the subscriber station 20 via the bus 40. The polling is accomplished by sending a message 46 based on a CAN FD frame, which is shown in FIG. 3. The subscriber station 20 sends a message 46 based on an FDL frame according to FIG. 3 to the subscriber station 10 via the bus 40 only if the commander subscriber station 10 has requested the responder subscriber station 20 to do so by means of a polling.

The subscriber station 10 thus has the function of a command transmitter/retriever and the subscriber station 20 has the function of an FDL responder. The subscriber station 10 is therefore also referred to hereinafter as the FDL commander and the subscriber station 20 as the FDL responder.

Figure 2:
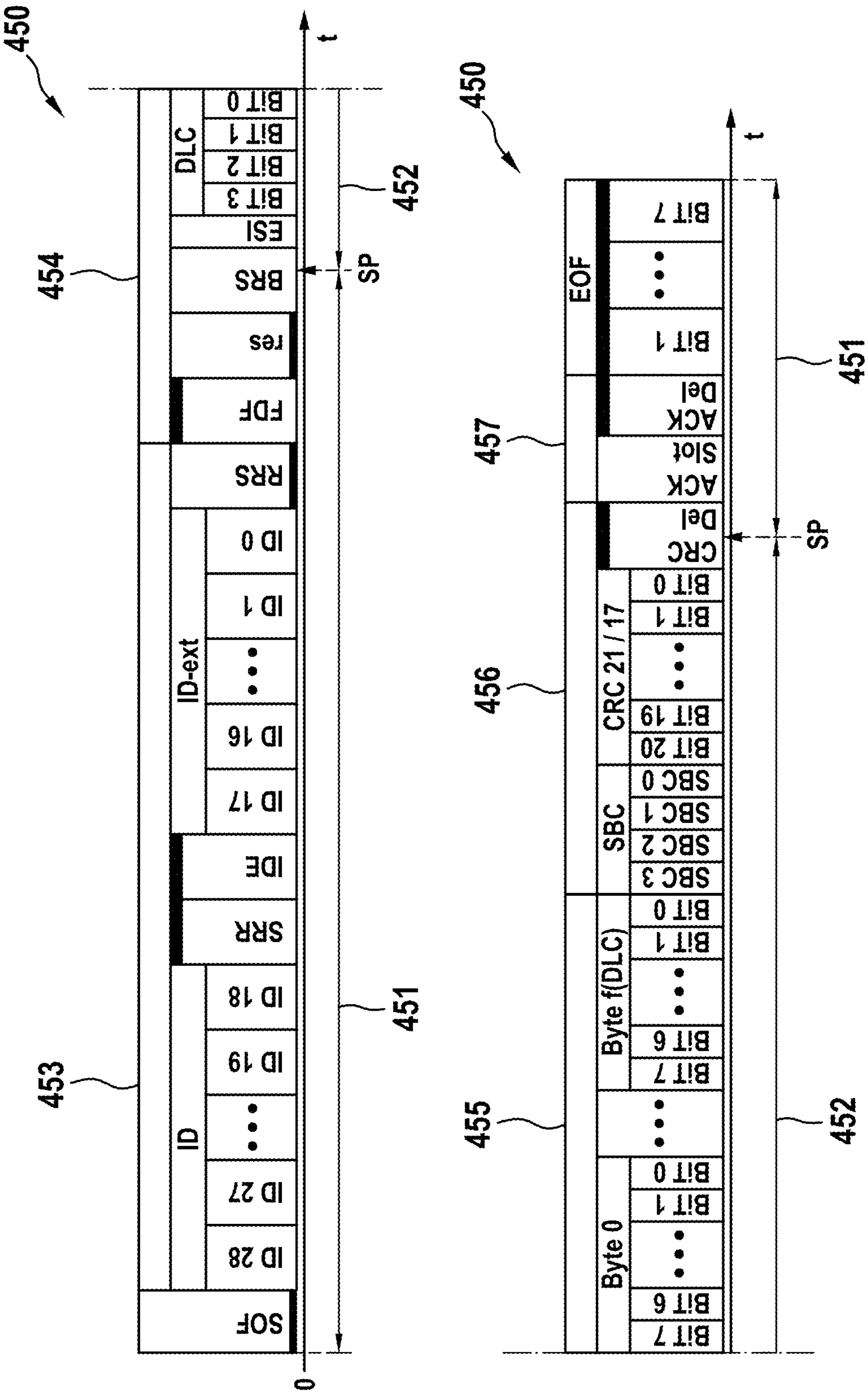
FIG. 2 shows the format of CAN FD frames according to the aforementioned standard ISO 11898-1:2015 for a message that can be transmitted by a transmitting/receiving device for a subscriber station of the bus system according to the first embodiment example of the present invention.

FIG. 2 shows a frame 450 created by one of the subscriber stations 10, 30 for a message 45 with up to 64 data bytes in the CAN FD format FEFF. The CAN FD frame 450 is provided by one of the communication control devices 11, 31, specifically encoded in a digital transmission signal TxD, for the associated transmitting/receiving device 12, 32 to be transmitted to the bus 40.

The frame 450 is divided into two communication phases that are referred to as the arbitration phase 451 (first communication phase) and the data phase 452 (second communication phase). The frame 450 begins and ends in the arbitration phase 451. The frame 450 begins with an SOF bit and comprises an arbitration field 453, a control field 454, a data field 455, a checksum field 456 (CRC field), an acknowledgement field 457 (ACK=acknowledge) and an end of frame field EOF (EOF=End of Frame).

Bits in the arbitration phase 451 of the frame 450 can have a longer bit time than bits of the data phase 452, as illustrated in FIG. 2 as an example. The switchover from the bits with the bit time of the arbitration phase 451 to the bits with the bit time of the data phase 452 takes place in a BRS bit as labeled SP in FIG. 2.

Bits that are shown in FIG. 2 with a thick line at their lower line are transmitted in the frame 450 as dominant or '0'. Bits that are shown in FIG. 2 with a thick line at their upper line are transmitted in the frame 450 as recessive or '1'. Bits such as those shown in FIG. 2 with a thick line have a predetermined fixed or defined value in the frame 450.

The arbitration field 453 includes an identifier of the frame 450 in the base ID field and the id-ext field. The identifier has 29 bits. An SRR bit and an IDE bit are provided between the base ID field and the id-ext field. A RRS bit is disposed at the end of the arbitration field 453. FIG. 2 shows the FEFF format with the 29-Bit "extended identifier".

The control field 454 begins with an FDF bit, followed by a res bit. This is followed by the BRS bit and an ESI bit. The ESI bit is therefore the first bit in the frame 450 with the bit time of the data phase 452.

The control field 454 ends with a DLC field in which the length of the following data field 455 is encoded. The res bit for the frame 450 has to be sent with a logical value 0, in other words as (logical) 0, i.e. dominant. However, if the subscriber station 20 receives a res bit with a logical value 1, in other words as (logical) 1, i.e. recessive, the receiving subscriber station 20 sees a protocol exception event PAE and goes into the state or operating mode of reintegration.

If the DLC field of the control field 453 has the value 0, there is no data field 455. The data field 455 has a length that corresponds to the value encoded in the DLC field. The value can be up to 64 bytes as mentioned above.

In an SBC field, the checksum field 456 contains the number of stuff bits modulo 8 that were inserted into the frame 450 in accordance with the bit stuffing rule; specifically one inverse bit has to be inserted after every five identical bits. In a CRC field, the checksum field 456 also contains a CRC checksum, which can also be referred to as a CRC checksum, and ends with a subsequent CRC delimiter CRC del.

The switchover from the bits with the bit time of the data phase 452 to the bits with the bit time of the arbitration phase 451 takes place in the CRC del bit as labeled SP in FIG. 2.

The acknowledgement field 457 contains an ACK slot bit, in which subscriber stations that are currently only receivers of the frame 450 but not transmitters of the frame can acknowledge or not acknowledge the correct reception of the frame 450 from the bus 40. The acknowledgement field 457 ends with an ACK del bit, which is also referred to as an ACK delimiter.

A bit sequence which marks the end of the frame 450 is provided in the end of frame field EOF. The bit sequence of the end field (EOF) thus serves to mark the end of the frame 450. Together with the ACK delimiter, the end field (EOF) ensures that a number of 8 recessive bits are sent at the end of the frame 450. This is a bit sequence that cannot occur within the frame 450. This enables the subscriber stations 10, 30 to reliably identify the end of the frame 450.

After the end field (EOF), which has 7 bits, there is an interframe space (IFS) in frame 450 that is not shown in FIG. 2. In CAN FD, this interframe space (IFS) is configured in accordance with ISO 11898-1:2015. The interframe space (IFS) has at least 3 bits.

The mentioned fields and bits are otherwise from ISO 11898-1:2015 and are therefore not described in more detail here.

In the arbitration phase 451 of CAN FD in the present example of FIG. 2, the identifier (ID), for example with bits ID28 to ID18, in the arbitration field 453 is used to negotiate bit by bit between the subscriber stations 10, 30 which subscriber station 10, 30 wants to send the message 45, 46 with the highest priority and therefore receive exclusive access to the bus 40 of the bus system 1 for the next transmission time in the subsequent data phase 452. In the arbitration phase 451, a physical layer is used as in CAN and CAN FD. The physical layer corresponds to the bit transmission layer or layer 1 of the conventional Open Systems Interconnection (OSI) model. The subscriber station 20 as the FDL responder subscriber station does not support arbitration as mentioned above and as described in more detail in the following. To be able to manage without CAN arbitration, in which the conventional CSMA/CR method resolves a collision if two CAN nodes start a message at the same time, the commander has to specify when which responder is permitted to send a message. In other words, if the commander has requested a specific responder to transmit via polling, the commander waits for the responder to reply before the commander sends any other message. If a responder who has received a polling but has not yet started to reply sees the start of another message on the CAN bus 40, it considers its polling completed and does not start its message 46. The document CiA 604-1 specifies the earliest possible time at which a responder may reply to the polling with a message. This send start can be delayed if the responder needs more time to prepare the send data. The response times of the various responders in the CAN system are known to the commander.

Collisions between FDL responders (e.g. subscriber stations 20) and the commander or any other CAN FD nodes (e.g. subscriber stations 30) that contain the arbitration function can also be avoided by assigning identifiers with a higher arbitration priority to the responders for transmission. The other nodes will therefore lose their arbitration if they start a message at the same time as a responder and become the receiver.

The subscriber station 10 as the sender of a message 45, 46 does not start transmitting bits of the data phase 452 to the bus 40 until the subscriber station 10 as the sender has won the arbitration and the subscriber station 10 as the sender thus has exclusive access to the bus 40 of the bus system 1 for transmission. The same applies to the subscriber station 30 if it wants to send a message 45 to the bus 40.

For the message 46, FIG. 3 shows an FDL frame 460 as provided by the subscriber station (responder) or its communication control device 21, specifically encoded in a digital transmission signal TxD, for the associated transmitting/receiving device 22 for transmission to bus 40. In the present embodiment example, the communication control device 21 creates the frame 460 as compatible with CAN FD, as also illustrated in FIG. 3.

According to FIG. 3, the FDL frame 460 for CAN communication on the bus 40 is also divided into different communication phases 451, 452, specifically the arbitration phase 451 and the data phase 452. After a start bit (SOF), the frame 460 comprises an arbitration field 463, a control field 464, a data field 465, a checksum field 466 and an acknowledgement field 467. This is followed by the end of frame field EOF as in a frame 450 according to FIG. 2.

The FDL format corresponds to the FBFF format from ISO 11898-1:2015. In this format, the sender can decide whether to set the BRS bit to 1 or 0, wherein BRS=bit rate switching. If the BRS bit is set to 1, the bit rate in the data phase 452 is increased or the bit time is reduced. If the BRS bit is set to 0, the bit rate or bit time is the same in the two communication phases 451, 452. In FDL, it is currently provided that the bit rate is not switched within the frame 460. Therefore, BRS=0 is sent. The commander then has to set the BRS bit to 0 in a message 46 to the responder so that the responder can understand.

In FDL communication with a frame 460, however, no arbitration is carried out in the arbitration phase 451 by the responder as described above with reference to FIG. 2. The communication control device 21 is instead configured as an FDL responder to write the identifier (ID) that was assigned to the responder in the frame 460. If the subscriber station 20 (responder) receives a polling from the subscriber station 10 (commander), the subscriber station 20 sends an FDL frame 460 according to FIG. 3 or a message 46 via the bus 40 to the subscriber station 10. To not interfere with the arbitration between the subscriber stations 10 and 30 on the bus 40, messages 46 of the subscriber station 20 therefore have an identifier (ID) with a higher priority than the identifiers (ID) of the subscriber stations 10 and 30.

When changing to the data phase 452, there is no bit rate switching in the frame 460. In other words, the bit time of bits of the arbitration phase 451 and the data phase 452 is the same. However, it is possible that the bit time in the first communication phase (arbitration phase) 451 can differ from the bit time in the second communication phase (data phase) 452.

In the data phase 452, the useful data of the FDL frame 460 or the message 46 are sent from the data field 465 and the checksum field 466 in addition to a part of the control field 464 of the frame 460. At the end of the checksum field 466 or before the acknowledgement field 467, the data phase 452 transitions back into the arbitration phase 451 as shown in FIG. 3.

As is shown in FIG. 3, in the arbitration phase 451, the subscriber station 20 partly uses, in particular up to and including the FDF bit, a format from CAN/CAN FD according to ISO 11898-1:2015 as the first communication phase as shown in FIG. 2. The subscriber station 20, on the other hand, uses an FDL format, which is described in the following, starting from the FDF bit in the first communication phase and in the data phase 452 as the second communication phase. As with CAN FD, recessive and dominant levels are used in the FDL data phase 452 for transmission to bus 40.

In general, two different stuffing rules are used when generating the frame 460. Up to the FDF bit in the arbitration field 453, the dynamic bit stuffing rule of CAN FD or for a frame 450 of FIG. 2 applies, so that one inverse stuff bit has to be inserted after every 5 identical bits in succession. In the data phase 452 up to the SBC field, a fixed stuffing rule applies, so that a fixed stuff bit has to be inserted after a fixed number of bits. Alternatively a number of 2 or more bits can be inserted as fixed stuff bits instead of only one stuff bit.

In the present embodiment example, the ESI bit from CAN FD is used to communicate at least one status information to the FDL commander. In the example of FIG. 1, the FDL commander is the subscriber station 10.

The DLC field and the data field 465 are configured as described above for FIG. 2. The data field 465 in particular has a length of 0 bytes if the DLC field of the control field 463 has the value 0.

The data field 465 is followed in the frame 460 by the checksum field 466, which is structured as in CAN FD as shown in FIG. 2.

This is followed by the acknowledgement field 467, which is structured as in CAN FD as also shown in FIG. 2. The acknowledgement field 467 contains an ACK slot bit, in which subscriber stations that are currently only receivers of the frame 460 but not transmitters of the frame can acknowledge or not acknowledge the correct reception of the frame 460 from the bus 40. The acknowledgement field 467 ends with an ACK del bit, which is also referred to as an ACK delimiter.

The acknowledgement field 467 is followed in the frame 460 by the end field (EOF=end of the frame), as in CAN FD according to FIG. 2.

The end field (EOF) is 7 recessive bits long.

The end field (EOF) is followed in the frame 460 by an interframe space (IFS) as discussed above with reference to the frame 450 of FIG. 2.

Figure 4:
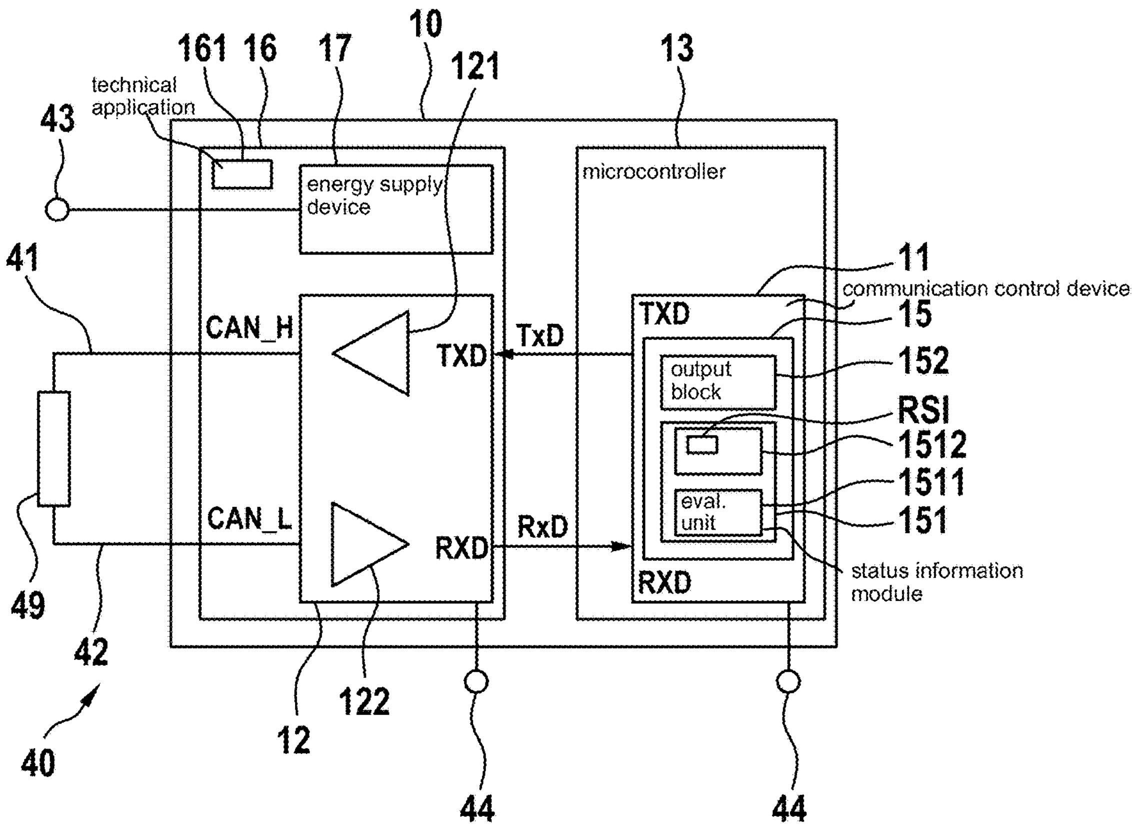
FIG. 4 shows a simplified schematic block diagram of a first subscriber station (commander) of the bus system according to the first embodiment example of the present invention.

FIG. 4 shows the basic structure of the subscriber station 10 with the communication control device 11, the transmitting/receiving device 12 and the status information module 15 which is part of the communication control device 11. In the subscriber station 20, the status information module 25 is in part identical in structure to the status information module 15. The subscriber station 30 is structured in a similar manner to that shown in FIG. 4, but the subscriber station 30 does not have a status information module 15 as shown in FIG. 1 as well. The subscriber station 30 is therefore not described separately.

According to FIG. 4, in addition to the communication control device 11 and the transmitting/receiving device 12, the subscriber station 10 also comprises a microcontroller 13 to which the communication control device 11 is assigned, and a system ASIC 16 (ASIC=application-specific integrated circuit), which can alternatively be a system basis chip (SBC), on which a plurality of functions necessary for an electronic assembly of the subscriber station 10 are combined. The system ASIC 16 in particular comprises an application 161 that can be configured as a computer program (app) or software. One such application is a technical application 161. The application 161 is any application in a vehicle, for example. The application is in particular a windshield washer system and/or driver assistance system, etc. The windshield washer system, for instance, controls the movement of at least one windshield wiper (actuator) using data from a rain sensor and/or wind sensor and/or speed sensor and/or light sensor and/or it can switch a warning light (actuator) on or off. The application is not limited to a windshield washer system or parts thereof, however.

In addition to the transmitting/receiving device 12, the system ASIC 16 also includes an energy supply device 17 which supplies electrical power to the transmitting/receiving device 12. The energy supply device 17 typically supplies a CAN_Supply voltage of 5 V. Depending on requirements, however, the energy supply device 17 can supply a different voltage with a different value. Additionally or alternatively, the energy supply device 17 can be configured as a current source.

If the communication control device 11 creates a frame 460 in which no bit rate switching/bit rate change occurs and/or evaluates a frame 460, the communication control device 21 acts as an FDL commander.

The status information module 15 comprises an evaluation block 151 and an output block 152. The evaluation block 151 comprises an evaluation unit 1511 and a memory unit 1512 in which responder status information RSI can be stored. The status information module 15 can be embodied at least partly as software.

The evaluation block 151, in particular its evaluation unit 1511, is configured to evaluate the ESI bit in the reception signal RxD of the message 46 using a frame 460. For the frame 460, a responder, for example the subscriber station 20, has created a transmission signal TxD at the request of the subscriber station 10 that the subscriber station has sent to the bus 40. The evaluation block 151 stores the value of the ESI bit or the responder status information RSI read from the frame 460 in the memory unit 1512. The responder status information RSI can be disposed in the data field 465 of the frame 460 of the message 46.

The output block 152 is configured to access the responder status information RSI in the memory unit 1512 and output the information RSI to the in particular one application 161 and/or the microcontroller 13. The function of the status information module 15 and the ESI bit, and the connection to the responder status information RSI is also described in more detail with reference to FIG. 9.

The transmitting/receiving device 12 further comprises a transmitter module 121 and a receiver module 122. Even if the following always refers to the transmitting/receiving device 12, it is alternatively possible to provide reference the receiver module 122 in a separate device external to the transmitter module 121. The transmitter module 121 and the receiver module 122 can be structured as in a conventional transmitting/receiving device 22. The transmitter module 121 can in particular comprise at least one operational amplifier and/or a transistor. The receiver module 122 can in particular comprise at least one operational amplifier and/or a transistor.

The transmitting/receiving device 12 is connected to the bus 40; more specifically to its first bus wire 41 for CAN_H and its second bus wire 42 for CAN_L. The voltage supply for the energy supply device 17 for supplying the first and second bus wire 41, 42 with electrical energy, in particular with the CAN supply voltage, is provided via at least one connection 43. The connection to ground or CAN_GND is realized via a connection 44. The first and second bus wire 41, 42 are terminated with a terminating resistor 49.

The first and second bus wire 41, 42 are connected in the transmitting/receiving device 12 not only to the transmitter module 121, which is also referred to as the transmitter, but also to the receiver module 122, which is also referred to as the receiver, even though the connection is not shown in FIG. 4 for the sake of simplicity.

During operation of the bus system 1, the transmitter module 121 of FIG. 4 can serially convert a transmission signal TxD of the communication control device 11 into corresponding CAN_H, CAN_L signals for CAN or CAN FD for the bus wires 41, 42 and send these signals to the connections for CAN_H and CAN_L on the bus 40. The communication control device 11 sends the transmission signal TxD of FIG. 5 over the time t (in series) via connections TXD to the transmitter module 121, as shown in FIG. 4. As shown as an example in FIG. 5, the transmission signal TxD has the voltage states H (high) and L (low) with a corresponding voltage U.

Figure 6:
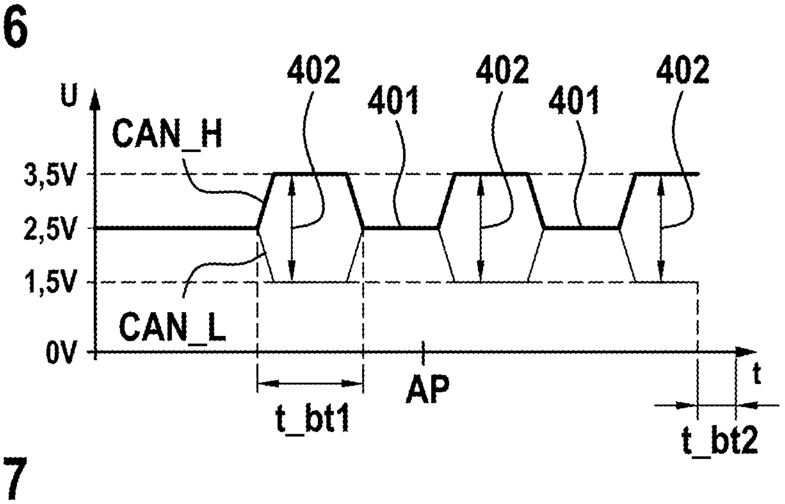
FIG. 6 shows a temporal progression of CAN_H and CAN_L bus signals at the first subscriber station according to the first embodiment example of the present invention.
Figure 7:
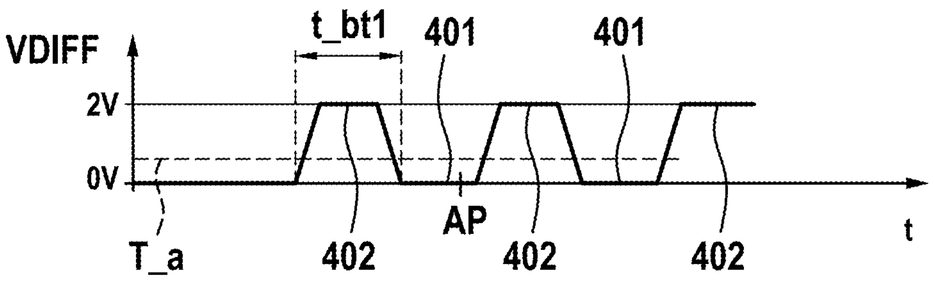
FIG. 7 shows a temporal progression of a differential voltage VDIFF of the CAN_H and CAN_L bus signals at the first subscriber station according to the first embodiment example of the present invention.

According to the example in FIG. 6, the CAN_H and CAN_L signals have the dominant and recessive bus levels 401, 402 as from CAN, at least in the arbitration phase 451. A difference signal VDIFF=CAN_H−CAN_L forms on the bus 40, which is shown in FIG. 7 for the arbitration phase 451. The individual bits of the signal VDIFF with the bit time t_bt1 can be identified in the arbitration phase 451 with a reception threshold T_a, for example of 0.7 V. In the data phase 452 of a frame 450, the bits of the CAN_H and CAN_L signals can be sent faster, i.e. with a shorter bit time t_bt2, than in the arbitration phase 451 as mentioned above. The CAN_H and CAN_L signals in CAN FD for the frame 450 in the data phase 452 thus differ from the conventional CAN_H and CAN_L signals at least in their faster bit rate.

Figure 5:
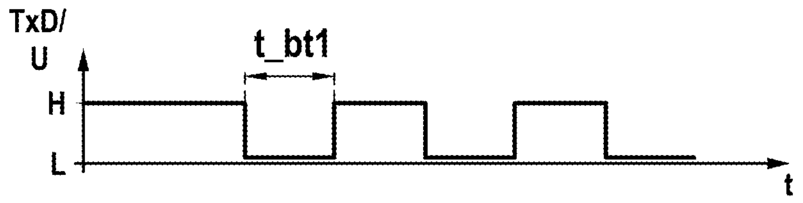
FIG. 5 shows a temporal progression of a digital transmission signal during operation of the bus system at the first subscriber station which is connected to the same bus of the bus system with at least one second subscriber station of the present invention.

The sequence of the states H, L of the transmission signal TxD of FIG. 5 and the resulting states 401, 402 for the CAN_H, CAN_L signals in FIG. 6 as well as the resulting progression of the voltage VDIFF of FIG. 7 serve only to illustrate the function of the subscriber station 10. The sequence of the data states for bus states 401, 402 can be selected as needed.

Figure 8:
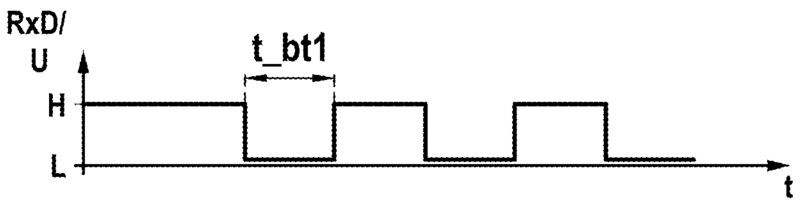
FIG. 8 shows a temporal progression of a digital reception signal generated by the first or a second subscriber station from a signal received from the bus that is based on the transmission signal of the first subscriber station, according to an example embodiment of the present invention.

The receiver module 122 creates a reception signal RxD from CAN_H and CAN_L signals received from the bus 40, which are shown in FIG. 6, or the differential voltage VDIFF of FIG. 7. To generate the digital reception signal RxD of FIG. 8, the receiver module 122 samples the signal VDIFF received from the bus 40 or at least one of the CAN_H, CAN_L signals at sampling points AP according to FIG. 6 or FIG. 7 as is conventional. The reception signal RxD is shown in FIG. 8 without propagation delay. The receiver module 122 passes this reception signal RxD to the associated communication control device 11 as shown in FIG. 4.

For a message 46 based on a frame 460, the signals of FIG. 5 to FIG. 8 apply accordingly.

Figure 9:
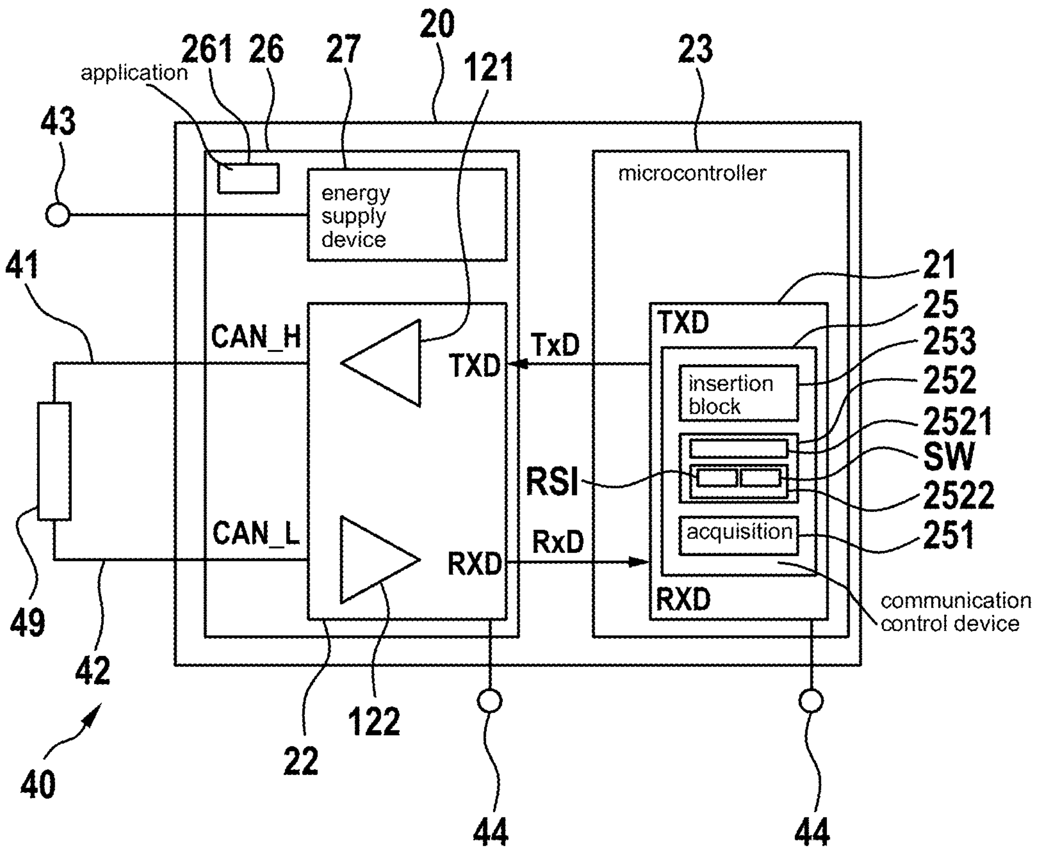
FIG. 9 shows a simplified schematic block diagram of a second subscriber station (responder) of the bus system according to the first embodiment example of the present invention.

According to FIG. 9, in addition to the communication control device 21 and the transmitting/receiving device 22, the subscriber station 20 also comprises a simple control unit (FSM) or optionally a microcontroller 23 to which the communication control device 21 is assigned, and a system ASIC 26 (ASIC=application-specific integrated circuit), which can alternatively be a system basis chip (SBC), on which a plurality of functions necessary for an electronic assembly of the subscriber station 20 are combined. The system ASIC 26 in particular comprises an application 261 that can be configured as a computer program (app) or software. One such application is a technical application 261. The application 261 is a control for a sensor, for instance, or an encoder or an actuator or the like, which is controlled by the application 161 (FIG. 4) of the commander subscriber station 10 or is intended to provide data for the application 161.

In addition to the transmitting/receiving device 22, the system ASIC 26 also includes an energy supply device 27 which supplies electrical power to the transmitting/receiving device 22. The energy supply device 27 typically supplies a CAN_Supply voltage of 5 V. Depending on requirements, however, the energy supply device 27 can supply a different voltage with a different value. Additionally or alternatively, the energy supply device 27 can be configured as a current source.

The communication control device 21 creates a frame 460 in which no bit rate switching or bit rate change occurs and/or evaluates such a frame 460 based on the frame 460 received from the commander subscriber station 10. The communication control device 21 can also be referred to as an FDL responder. The communication control device 21 can create the frame 460 after the previous status of the subscriber station 20 has changed, for example, or not until after a request commander subscriber station 10. However, the devices 21, 22 can send such a frame 460 to the bus 40 only after a request from the commander subscriber station 10 (polling).

The transmitter module 222 of FIG. 9 is otherwise structured in the same manner as described above for the transmitter module 122 of FIG. 4.

The status information module 25 of FIG. 9 comprises an acquisition block 251, an evaluation block 252 and an insertion block 253. The evaluation block 252 comprises an evaluation unit 2521 and a memory unit 2522 in which a responder status information RSI and/or at least one parameter or target value SW can be stored.

The acquisition block 251 acquires the current status or the current status information RSI of the subscriber station 20 (responder). The acquisition block 251 stores its acquisition result in the memory unit 2522 of the evaluation block 252.

The evaluation block 251, in particular its evaluation unit 2521, is configured to evaluate whether the current status stored in the memory unit 2522 or the current status information RSI of the subscriber station 20 (responder) has changed or has remained the same, for instance. Depending on the result, the evaluation block 252 controls the insertion block 253 to insert the ESI bit of a frame 460 according to the current status information RSI of the subscriber station 20 (responder). For this purpose, the insertion block 253 sets the value of the ESI bit according to the current status information RSI of the subscriber station 20 (responder).

If the current status or the current status information RSI of the subscriber station 20 (responder) has changed, the responder sends the ESI bit in its next message 46, which is created on the basis of a frame 460, for example as logical 1.

After evaluating the frame 460 with its module 15, the subscriber station 10 (commander) then sees a value for the ESI bit that is not equal to the predetermined value, specifically logical 0. The subscriber station 10 (commander) therefore sends a status request message, which is created based on a frame 460, to the subscriber station 20 (responder). In response, the subscriber station 20 (responder) replies with a frame 460 into the data field 465 of which the status data of the responder is inserted. The subscriber station 20 (responder) can additionally or alternatively insert diagnostic data into the data field 465.

The subscriber station 10 (commander) therefore only asks the responder for status data and/or diagnostic data if the current status of the subscriber station 20 (responder) has changed and the responder has communicated this with the ESI bit. Thus, the subscriber station 10 (commander) does not regularly request this from the responder. This is particularly advantageous because the status rarely changes, but the commander does not know when the status changes and would therefore have to make frequent inquiries.

The change in the status information RSI of the subscriber station 20 (responder) can consequently be sent in accordance with the evaluation result of the evaluation block 252 and with the aid of the ESI bit of a frame 460 when the subscriber station 10 (commander) makes a query. The frame 460 is created by the subscriber station 20 (responder) as a message 46 and sent in series to the subscriber station 10 (commander).

The status information module 25 of FIG. 9 is, for instance, configured for at least one of the following options for selecting the status information RSI for the ESI bit. The acquisition block 151 carries out its acquisition depending on the type of status information, RSI for the ESI bit.

The status information RSI for the ESI bit can, for instance, be at least one item of information for FDL communication, specifically:

Option a): The subscriber station 20 (responder) has received an invalid frame 460 since its last transmitted frame 460.

Option b): The subscriber station 20 (responder) had to recalibrate since its last transmitted frame 460.

Option c): The subscriber station 20 (responder) could not start its last transmission job because it could not identify the idle state on the CAN bus 40 in time. The idle state can take place in the interframe space (IFS), which can occur between two frames 450, 460 or two frames 450, 450 or two frames 460, 460 or two frames 460, 450.

Option d): one of the aforementioned options a) or b) or c).

To acquire which status of the subscriber station 20 (responder) is occurring, the acquisition block 251 can comprise at least one counter and/or at least one logic circuit for counting transmitted or received frames 460. For said acquisition, the acquisition block 251 increments or decrements the at least one counter, for example, by a predetermined value if a frame 460 or a predetermined bit of the frame 460 has been received correctly. There can also be an additional counter that counts the communication cycles, for example by incrementing the counter value of the counter after each switchover between the phases 451, 452.

It is in particular possible to count invalid received frames 460. A period of time can be acquired as well, in particular with respect to the last transmitted frame 460 and/or a received invalid frame 460 and/or the last transmitted frame 460 and/or a calibration of the subscriber station 20 (FDL responder).

The status information modules 15, 25 thus ensure that the subscriber station 10 (commander) only requests status data from the subscriber station 20 (responder) when necessary, specifically if the current status of the responder has changed. As a result, no unnecessary messages 46 are sent between the subscriber stations 10, 20 via the bus 40. This leaves more bandwidth on the bus 40 for other messages 45, 56, which in particular contain application data, such as acquisition results, etc., of the applications 161, 261.

The status information modules 15, 25 thus ensure that the bus 40 is occupied for less time or less frequently, so that the bus 40 has more capacity for useful data.

This has the additional advantage that the number of responders that can be connected to the same bus 40 can be increased if necessary.

According to a second embodiment example, the subscriber station 20 is configured to display an application status of the at least one application 261 of the ASICS 26 as status information RSI for the ESI bit. Such a status is in particular the exceedance of a temperature threshold (limit value).

The acquisition block 251 accordingly comprises at least one temperature sensor in order to determine the information of the ESI bit for the FDL communication. In addition, at least one counter can be included with which a period of time for the temperature increase is acquired.

According to a third embodiment example, the subscriber station 20 is configured to display a health status of the subscriber station 20 (responder) as status information RSI for the ESI bit. Such a health status is in particular that the subscriber station 20 (responder) has not received a frame 460 from the subscriber station 10 (commander) since a period of time T_timeout, and/or that the subscriber station 20 (responder) detects a malfunction of its application 261, which is a sensor or an actuator, for example, or comprises at least one such sensor or actuator.

The acquisition block 251 accordingly comprises at least one counter with which the period of time T_timeout is acquired in order to determine the information of the ESI bit for the FDL communication. The period of time T_timeout can also be stored as a parameter or target value SW in the memory unit 2522. In addition, at least one sensor can be included with which the malfunction of the application 261 of the subscriber station 20 (responder) can be detected.

According to a fourth embodiment example, the following applies to the communication between the subscriber station 20 (responder) and its higher-level subscriber station 10 (commander).

The function of the ESI bit is defined individually for each subscriber station 20 (responder) depending on the application. Therefore, the acquisition block 251 can define the information of the ESI bit by accessing a memory block.

In at least one first responder ASIC 26, the ESI bit has a predetermined first function. In at least one second responder ASIC 26, the ESI bit has a different, specifically predetermined, second function. The commander knows its responders and can therefore interpret the ESI bit correctly.

It is also possible for the commander to assign the ESI bit different functions for each configuration, depending on the operating mode.

With any of the above-described configurations of the subscriber stations 10, 20, the communication in the bus system 1 can be improved in such a way that the net data rate in the bus system 1 can be increased.

All of the above-described configurations of the subscriber stations 10, 20, 30, the bus system 1 and the method carried out therein can be used alone or in all possible combinations. It is in particular possible to combine all features of the above-described embodiment examples and/or modifications thereof as desired. Additionally or alternatively, in particular the following modifications are possible.

Even though the present invention is described above using the example of the CAN bus system, the present invention can be used in any communication network and/or communication method that uses two different communication phases in which the bus states generated for the different communication phases differ.

The bus system 1 according to the embodiment examples can in particular be a communication network in which data can be transmitted in series at two different bit rates. It is advantageous, but not necessarily a prerequisite, that exclusive, collision-free access of a subscriber station 10, 20, 30 to a common channel is ensured in the bus system 1 at least for specific periods of time.

The number and arrangement of the subscriber stations 10, 20, 30 in the bus system 1 of the embodiment examples is as needed. It is possible for there to be one or more of the subscriber stations 10 or 30 in the bus system 1. It is possible for there to be more than one subscriber station 10, to which at least one subscriber station 20 is assigned as described above, in the bus system 1. It is possible that there is no subscriber station 30 in the bus system 1. There is in particular only one subscriber station 10 (commander) and at least one subscriber station 20 (responder).

It is possible that the module 15 is disposed separately from the communication control device 11 in a subscriber station 10.

What is claimed is:

1. A commander subscriber station for a serial bus system, comprising:

a communication control device configured to control communication between the commander subscriber station and at least one other subscriber station of the bus system and evaluate at least one signal received from a bus of the bus system using a predetermined first frame or a predetermined second frame, wherein the in the predetermined first and second frames, a bit time in a first communication phase can differ from a bit time in a second communication phase; and a status information module configured to evaluate the at least one signal received from the bus with respect to a predetermined control bit;

wherein the communication control device is configured to use the predetermined second frame to request a responder subscriber station subordinate to the commander subscriber station to send at least one first signal according to the predetermined second frame which differs from the predetermined first frame via the bus; and wherein the status information module is configured to instruct the communication control device based on the evaluation of the value of the predetermined control bit to use the second predetermined frame to request the responder subscriber station to send at least one second signal according to the second predetermined frame via the bus in order to receive status information from the responder subscriber station.

2. The commander subscriber station according to claim 1, wherein:

the predetermined control bit according to the predetermined second frame is provided for information about a presence or absence of an error passive state of a subscriber station that sent the received signal to the bus, and the status information module is configured to evaluate the predetermined control bit according to the predetermined second frame as a change in status information of the responder subscriber station that is controlled with the commander subscriber station via the bus and cannot go into the error passive state.

3. The commander subscriber station according to claim 1, wherein the status information module is configured to instruct the communication control device to use the predetermined second frame to request the responder subscriber station to send a second signal according to the predetermined second frame via the bus when the evaluation of the signal received from the bus shows that a value of the predetermined control bit according to the predetermined second frame corresponds to the information about presence of an error passive state of a subscriber station that sent the received signal to the bus.

4. The commander subscriber station according to claim 1, wherein:

the commander subscriber station is a CAN FD subscriber station, the predetermined first frame is a CAN FD frame in FEFF format, and the predetermined second frame is a CAN FD frame in FBFF format.

5. The commander subscriber station according to claim 1, wherein the status information module includes an evaluation block for evaluating the predetermined control bit.

6. The commander subscriber station according to claim 1, wherein the communication control device is configured to negotiate with other subscriber stations in the first communication phase of the predetermined first frame which of the subscriber stations of the bus system will receive at least temporarily exclusive, collision-free access to the bus in the following second communication phase.

7. A responder subscriber station for a serial bus system, comprising:

a communication control device configured to control communication between the responder subscriber station and a higher-level commander subscriber station of the bus system and to evaluating at least one signal received from a bus of the bus system using a frame in which a bit time in a first communication phase can differ from a bit time in a second communication phase; and a status information module configured to detect a change in status information of the responder subscriber station;

wherein the status information module is configured to indicate, after detecting the change in the status information of the responder subscriber station in a predetermined control bit of a frame to be sent by the responder subscriber station to the commander subscriber station for a first message following the change, that a change in the status of the responder subscriber station has occurred;

wherein the communication control device is configured, upon request from the commander subscriber station, to send a signal for the first message following the change to the bus to the commander subscriber station;

wherein the status information module is configured to insert the changed status information into a data field of a frame for a second message following the change to the commander subscriber station; and wherein the communication control device is configured, upon request from the commander subscriber station, to send a signal for the second message following the change to the bus to the commander subscriber station.

8. The responder subscriber station according to claim 7, wherein the responder subscriber station is configured to evaluate the status information acquired by the status information module with respect to at least one parameter, but not go into an error passive state even when the evaluation shows that there is an error in the responder subscriber station.

9. The responder subscriber station according to claim 7, wherein the status information includes at least one item of information relating to the communication between the responder subscriber station and the higher-level commander subscriber station.

10. The responder subscriber station according to claim 7, wherein the status information includes at least one item of information relating to a status of a technical application of the responder subscriber station.

11. The responder subscriber station according to claim 10, wherein the status information is defined individually for the responder subscriber station depending on the technical application of the responder subscriber station.

12. The responder subscriber station according to claim 7, wherein:

the status information includes at least one item of information relating to a health status of the responder subscriber station, and the health status is: (i) a failure to receive a frame from the commander subscriber station past a predetermined waiting period, or (ii) a malfunction of a technical application of the responder subscriber station.

13. The responder subscriber station according to claim 7, wherein the status information module comprises:

an acquisition block configured to acquire the status information, an evaluation block configured to evaluate an acquisition result of the acquisition block based on at least one parameter, and an insertion block configured to insert the status information into a frame to be created by the responder subscriber station based on the evaluation carried out by the evaluation block.

14. A bus system, comprising:

a bus; and at least two subscriber stations which are connected to one another via the bus such that they communicate in series with one another and of which at least one subscriber station is a commander subscriber station and at least one subscriber station is a responder subscriber station, wherein the commander subscriber station includes:

a communication control device configured to control communication between the commander subscriber station and at least one other subscriber station of the bus system and evaluate at least one signal received from a bus of the bus system using a predetermined first frame or a predetermined second frame, wherein the in the predetermined first and second frames, a bit time in a first communication phase can differ from a bit time in a second communication phase, and a status information module configured to evaluate the at least one signal received from the bus with respect to a predetermined control bit;

wherein the communication control device is configured to use the predetermined second frame to request a responder subscriber station subordinate to the commander subscriber station to send at least one first signal according to the predetermined second frame which differs from the predetermined first frame via the bus, and wherein the status information module is configured to instruct the communication control device based on the evaluation of the value of the predetermined control bit to use the second predetermined frame to request the responder subscriber station to send at least one second signal according to the second predetermined frame via the bus in order to receive status information from the responder subscriber station;

wherein the responder subscriber station includes:

a communication control device configured to control communication between the responder subscriber station and the commander subscriber station of the bus system and to evaluating at least one signal received from a bus of the bus system using a frame in which a bit time in the first communication phase can differ from a bit time in the second communication phase, and a status information module configured to detect a change in status information of the responder subscriber station, wherein the status information module is configured to indicate, after detecting the change in the status information of the responder subscriber station in a predetermined control bit of a frame to be sent by the responder subscriber station to the commander subscriber station for a first message following the change, that a change in the status of the responder subscriber station has occurred, wherein the communication control device is configured, upon request from the commander subscriber station, to send a signal for the first message following the change to the bus to the commander subscriber station, wherein the status information module is configured to insert the changed status information into a data field of a frame for a second message following the change to the commander subscriber station, and wherein the communication control device is configured, upon request from the commander subscriber station, to send a signal for the second message following the change to the bus to the commander subscriber station;

wherein each of the at least two subscriber stations also includes a transmitting/receiving device configured to transmit a transmission signal to the bus of the bus system and/or to receive a signal from the bus of the bus system.

15. The bus system according to claim 14, further comprising at least one third subscriber station which is configured to negotiate with the other subscriber stations in the first communication phase of the predetermined first frame which of the subscriber stations of the bus system will receive at least temporarily exclusive, collision-free access to the bus in a following second communication phase.

16. A method for communication in a serial bus system, the method comprising:

providing at least two subscriber stations which are connected to one another via a bus of the bus system such that they communicate in series with one another and of which at least one subscriber station is a commander subscriber station and at least one subscriber station is a responder subscriber station, wherein the commander subscriber station includes:

a communication control device configured to control communication between the commander subscriber station and at least one other subscriber station of the bus system and evaluate at least one signal received from a bus of the bus system using a predetermined first frame or a predetermined second frame, wherein the in the predetermined first and second frames, a bit time in a first communication phase can differ from a bit time in a second communication phase, and a status information module configured to evaluate the at least one signal received from the bus with respect to a predetermined control bit;

wherein the communication control device is configured to use the predetermined second frame to request a responder subscriber station subordinate to the commander subscriber station to send at least one first signal according to the predetermined second frame which differs from the predetermined first frame via the bus, and wherein the status information module is configured to instruct the communication control device based on the evaluation of the value of the predetermined control bit to use the second predetermined frame to request the responder subscriber station to send at least one second signal according to the second predetermined frame via the bus in order to receive status information from the responder subscriber station;

wherein the responder subscriber station includes:

a communication control device configured to control communication between the responder subscriber station and the commander subscriber station of the bus system and to evaluating at least one signal received from a bus of the bus system using a frame in which a bit time in the first communication phase can differ from a bit time in the second communication phase, and a status information module configured to detect a change in status information of the responder subscriber station, wherein the status information module is configured to indicate, after detecting the change in the status information of the responder subscriber station in a predetermined control bit of a frame to be sent by the responder subscriber station to the commander subscriber station for a first message following the change, that a change in the status of the responder subscriber station has occurred, wherein the communication control device is configured, upon request from the commander subscriber station, to send a signal for the first message following the change to the bus to the commander subscriber station, wherein the status information module is configured to insert the changed status information into a data field of a frame for a second message following the change to the commander subscriber station, and wherein the communication control device is configured, upon request from the commander subscriber station, to send a signal for the second message following the change to the bus to the commander subscriber station;

wherein each of the at least two subscriber stations also includes a transmitting/receiving device configured to transmit a transmission signal to the bus of the bus system and/or to receive a signal from the bus of the bus system.

* * * * *